(12) United States Patent
Kwok et al.

(10) Patent No.: US 8,120,735 B2
(45) Date of Patent: Feb. 21, 2012

(54) TRANSFLECTIVE LIQUID CRYSTAL DISPLAY

(75) Inventors: Hoi Sing Kwok, Hong Kong (CN); Vladimir Grigorievich Chigrinov, Hong Kong (CN)

(73) Assignee: The Hong Kong University of Science and Technology, Hong Kong (HK)

( * ) Notice: Subject to any disclaimer, the term of this patent is extended or adjusted under 35 U.S.C. 154(b) by 140 days.

(21) Appl. No.: 12/331,954

(22) Filed: Dec. 10, 2008

(65) Prior Publication Data

US 2009/0147187 A1 Jun. 11, 2009

Related U.S. Application Data

(60) Provisional application No. 60/996,903, filed on Dec. 10, 2007.

(51) Int. Cl.
*G02F 1/1335* (2006.01)
*G02F 1/1343* (2006.01)
(52) U.S. Cl. .................. 349/114; 257/E21.002
(58) Field of Classification Search ............. 349/68, 349/98, 99, 123, 113–114, 179–180, 187; 257/E21.002
See application file for complete search history.

(56) References Cited

U.S. PATENT DOCUMENTS

| | | | |
|---|---|---|---|
| 5,926,245 A | 7/1999 | Kwok et al. | |
| 6,801,281 B2 | 10/2004 | Huang et al. | |
| 6,836,306 B2 * | 12/2004 | Kubota et al. | 349/114 |
| 6,912,027 B2 | 6/2005 | Kim | |
| 7,239,365 B2 | 7/2007 | Chang et al. | |
| 7,557,897 B2 * | 7/2009 | Lee et al. | 349/179 |
| 2006/0119752 A1 * | 6/2006 | Okamoto et al. | 349/12 |
| 2006/0215084 A1 * | 9/2006 | Roosendaal et al. | 349/114 |
| 2007/0013835 A1 * | 1/2007 | Matsushima et al. | 349/113 |
| 2009/0040432 A1 * | 2/2009 | Lu et al. | 349/68 |
| 2009/0073352 A1 * | 3/2009 | Hamilton et al. | 349/96 |
| 2010/0118246 A1 * | 5/2010 | Nakagawa | 349/129 |

* cited by examiner

*Primary Examiner* — Akm E Ullah
(74) *Attorney, Agent, or Firm* — Leydig, Voit & Mayer, Ltd.

(57) ABSTRACT

Pixels of an LCD are divided into two sub-pixels, one for a reflective mode and one for a transmittive mode. The cell gaps of both sub-pixels are the same, improving fabrication ease. A novel photoalignment technique is used together with a shadow mask in an embodiment of the invention. Double exposure of the alignment layer with different orientations produces different alignment directions, thereby achieving the different LCD modes for the sub-pixels.

14 Claims, 10 Drawing Sheets

TRANSFLECTIVE LIQUID CRYSTAL DISPLAY

FIELD OF THE INVENTION

This invention relates generally to liquid crystal display technology and, more particularly, to a transflective liquid crystal display mode and methods of fabrication thereof.

BACKGROUND

Liquid crystal displays (LCDs) are used in many electronic products today. For example, with respect to mobile applications, a mobile device display should be viewable under strong ambient light as well as in the dark. In the dark, a backlight is provided so that the LCD operates in a transmittive mode, i.e., the generated light is transmitted through the LCD. When there is sufficient ambient light, the LCD should be able to operate in a reflective mode, meaning that the display is made visible by ambient light reflecting from the LCD. In order for both the reflective mode and the transmittive mode to be possible, the reflectance-voltage curve (RVC) and the transmittance-voltage curve (TVC) should overlap.

Numerous types of transflective displays are known. For example, Huang et al. (U.S. Pat. No. 6,801,281) teaches a method of fabricating a reflector so that the reflective light path is the same distance as the transmittive light path. Another reference, Kim (U.S. Pat. No. 6,912,027), teaches a transflective display having two different cell gaps. Similarly, Kubota et al. (U.S. Pat. No. 6,836,306) teaches a transflective LCD having two cell gaps and two twist angles wherein the cell gap and twist angle ratios are the same. The Chang et al. reference (U.S. Pat. No. 7,239,365) teaches a transflective display wherein the electrodes are patterned into strips so that a lateral field is generated to provide switching of the reflective and transmittive displays. In U.S. Pat. No. 5,926,245, Kwok et al. teaches a design having a single polarizer display. These reflective LC modes are useful in the design of transflective displays.

However, despite the numerous attempts to develop a display having optimal transmittive and reflective characteristics that can be produced in an economical and efficient manner, such a system has not been fully realized.

SUMMARY OF THE INVENTION

In the present disclosure, a new transflective LCD is disclosed, having excellent optical properties, including good optical efficiency in both the transmittive and reflective modes, and excellent contrast and viewing angles. The new transflective LCD also has the benefit of being generally easy to fabricate.

There are many types of transflective LCDs, but they can be generally divided into those having no sub-pixels, and those requiring two sub-pixels. In the case of single pixel, the same pixel functions in the transmittive and in the reflective modes. A partial reflector is provided for achieving the reflective display effect. In the case of two sub-pixels, or the so-called double-pixel designs, one of the sub-pixels is provided with a total internal reflector for the reflective mode, and the other sub-pixel is used as the transmittive mode with no reflectors.

For the case of double-pixel designs, the two sub-pixels can be of equal cell gap, but are more commonly of different cell gaps. Different cell gaps can more easily be made to compensate for the difference in path lengths inside the LCD cell for the transmittive and reflective components. However, such double cell gap designs are more costly and difficult to manufacture. Moreover, in most known designs of this type, internal retardation films are needed to equalize the RVC and TVC of the sub-pixels.

In the present invention, the pixels of the LCD are divided into two sub-pixels, one for the reflective mode and one for the transmittive mode. However, the cell gaps of both sub-pixels are the same, making it easy to fabricate as compared to those designs requiring dual cell gaps. Additionally no internal retardation films are required, making the display easy and economical to fabricate.

More particularly, the present invention employs a novel photoalignment technique to achieve two different LCD modes for the reflective and for the transmittive sub-pixels. The photoalignment technique is used together with a shadow mask in an embodiment of the invention to achieve this effect. Double exposure of the alignment layer with different orientations can produce different alignment directions, thereby achieving the different LCD modes for the sub-pixels.

Within the scope of the invention, many different optical modes can be used for the transflective display. As will be appreciated, high optical efficiency is also of a concern in making practical transflective displays, and embodiments of the invention allow high optical efficiencies to be achieved with the LCD modes described herein.

DETAILED DESCRIPTION

Figure 1:
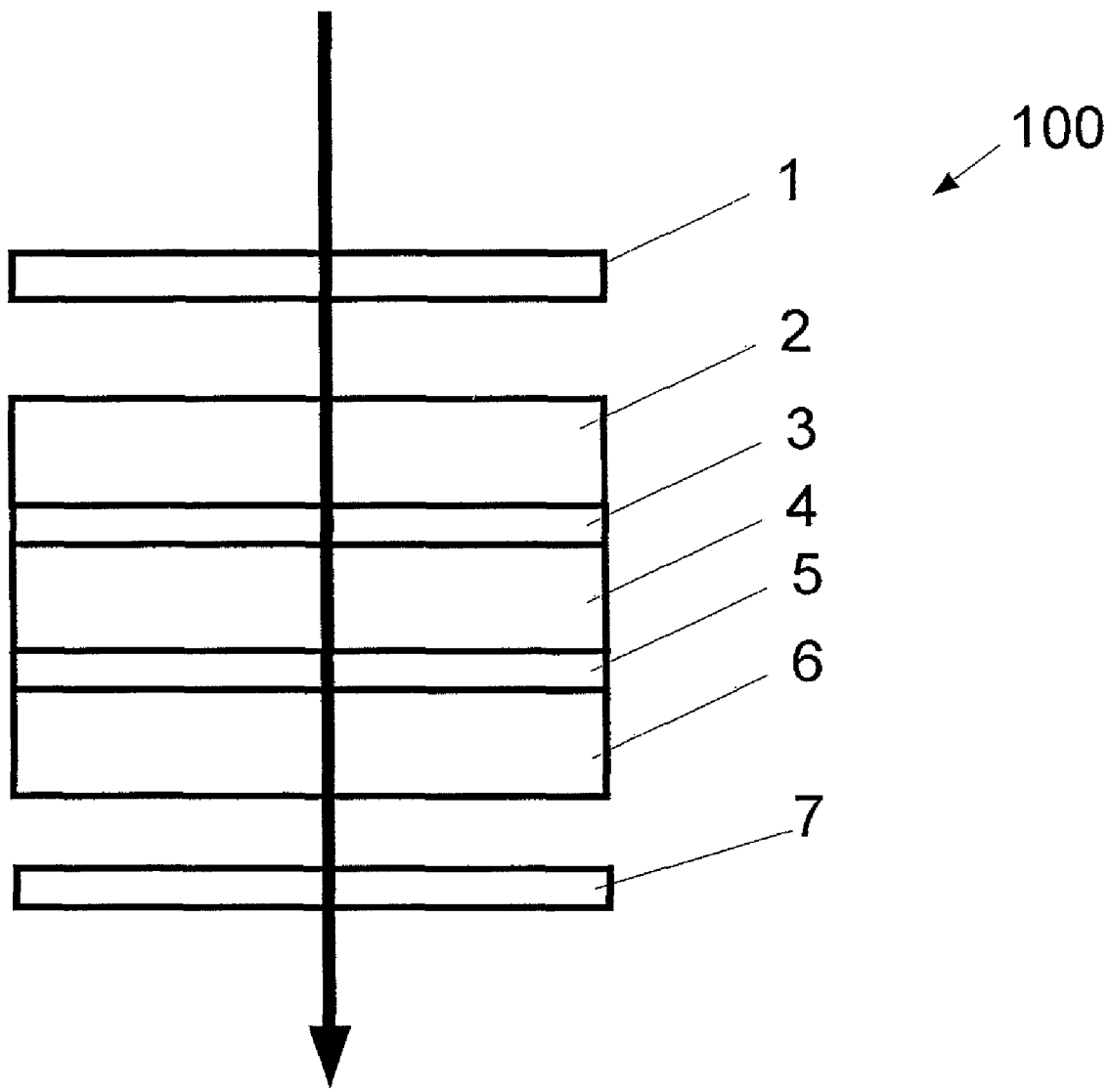
FIG. 1 is a simplified schematic view showing a typical construction for a transmittive liquid crystal cell.

Referring now to the drawings, FIG. 1 shows a traditional liquid crystal (LC) cell structure 100. The LC cell consists primarily of (1) the glass substrates 2 and 6, with alignment layers 3 and 5 associated with them, and (2) the LC layer 4. In addition, front and rear polarizers 1 and 7 are needed to manifest the polarization manipulation of the LC cell and show bright or dark states of the display. Other structures such as the active matrix thin film transistors and spacers, retardation films etc are not shown here for the sake of clarity, but may also be used if desired or needed for a particular application or implementation.

The optical properties of the LC display 100 are defined by a twist angle and a retardation dΔn of the LC layer 4. Here d is the cell gap and Δn is the birefringence of the LC material. The alignment layers 3 and 5 determine the twist angle as well as the pretilt angle of the LC layer. Transparent conductive electrodes (not shown in FIG. 1) are employed to facilitate the application of voltages across the LC layer to change it transmittance or reflectance. The transparent conductor is usually indium tin oxide (ITO), and the application of voltage can be by passive matrix or by active matrix with thin film transistors.

Figure 2:
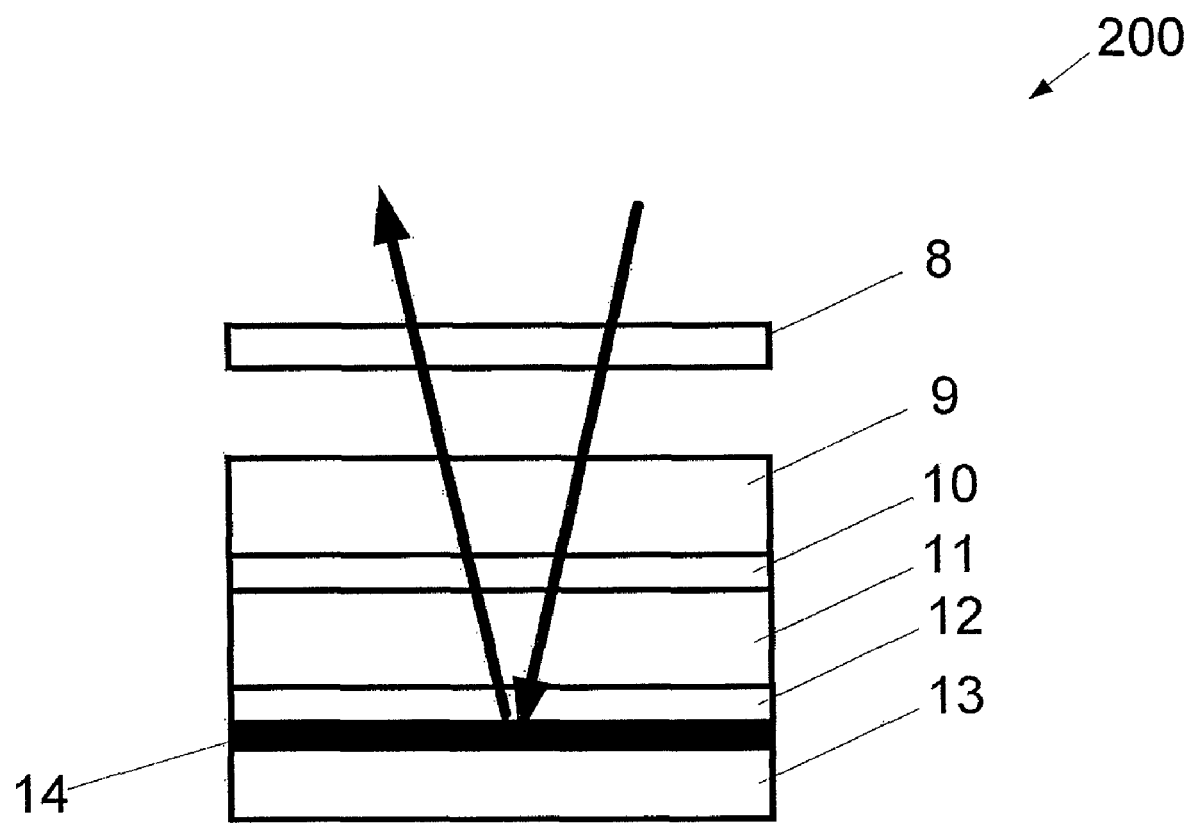
FIG. 2 is a simplified schematic view showing a typical construction for a reflective liquid crystal cell.

For the LC 100 display to function properly, one or more polarizers are used. For a transmittive LCD, two polarizers (shown as elements 1 and 7) are used, with one disposed on each side of the LC cell 100. While FIG. 1 shows a typical transmittive LCD, FIG. 2 shows the structure of a typical reflective LCD 200. In the case of a reflective LCD 200, only the front polarizer 8 is needed, since the rear portion of the LCD 200 is not illuminated. Because there is no backlight, a total or partial reflector 14 is used to reflect the ambient light. The reflector 14 can be placed inside the LC cell 200, as shown in FIG. 2, or placed outside the glass cell. The other components of the cell 200 are similar to the structure shown in FIG. 1 and will not be discussed at length, other than to note that glass substrates 9 and 13, and alignment layers 10 and 12 are used, along with an LC layer 11.

Figure 3:
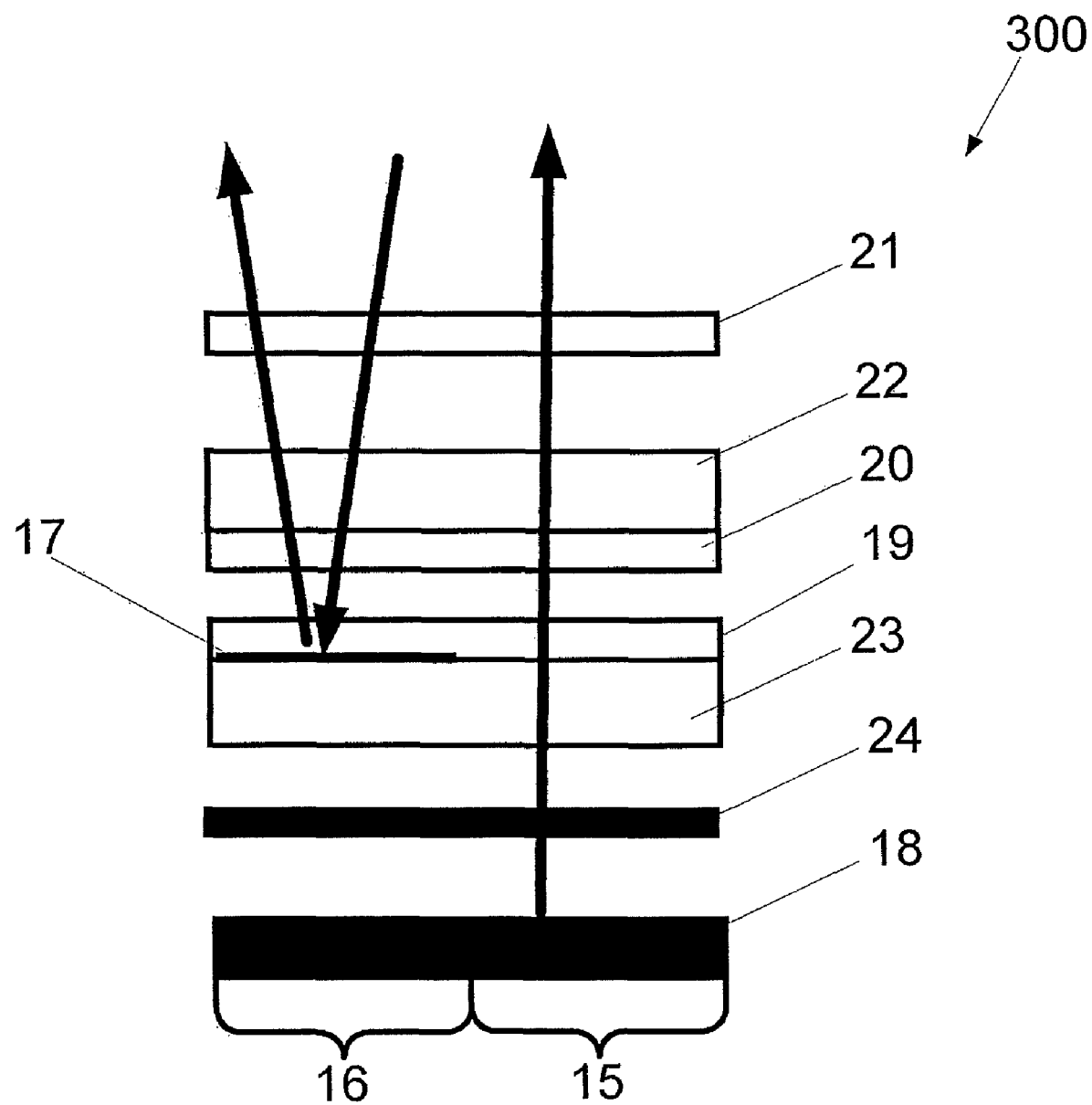
FIG. 3 is a simplified schematic view showing the construction of a double pixel single cell gap transflective display.

Referring now to FIG. 3, this figure shows a transflective LCD cell 300 having a double pixel structure. One sub-pixel 15 is used for the transmittive display and one sub-pixel 16 is used for reflective display. An internal reflector 17 is provided for the reflective sub-pixel 16. The cell gaps of both sub-pixels are the same or substantially the same. A contact (not shown), such as one made of conductive transparent electrode of indium tin oxide, is provided for the application of voltages to the display 300. The voltage across the reflective 16 and transmittive 15 sub-pixels can be the same or different. A backlight 18 is also used as shown since the transmittive sub-pixel 15 requires a backlight to function.

In an embodiment of the invention, a photoalignment layer 19 is used on one side of the LC cell 300 as shown. The other side of the LC cell 300 has a conventional polyimide alignment layer 20 that requires mechanical rubbing to provide an alignment direction. The choice of whether to use the top side or the bottom side alignment layer as the photoalignment layer is arbitrary. The choice can be reversed and it will not affect the present invention.

The purpose of a photoalignment layer 19, 20, is to produce different alignment directions for the transmittive sub-pixel 15 and the reflective sub-pixel 16. It will be appreciated that substrates 22, 23, front polarizer 21, rear polarizer 24, and backlight 9 will also be used, although these will not be discussed at length.

Figure 4:
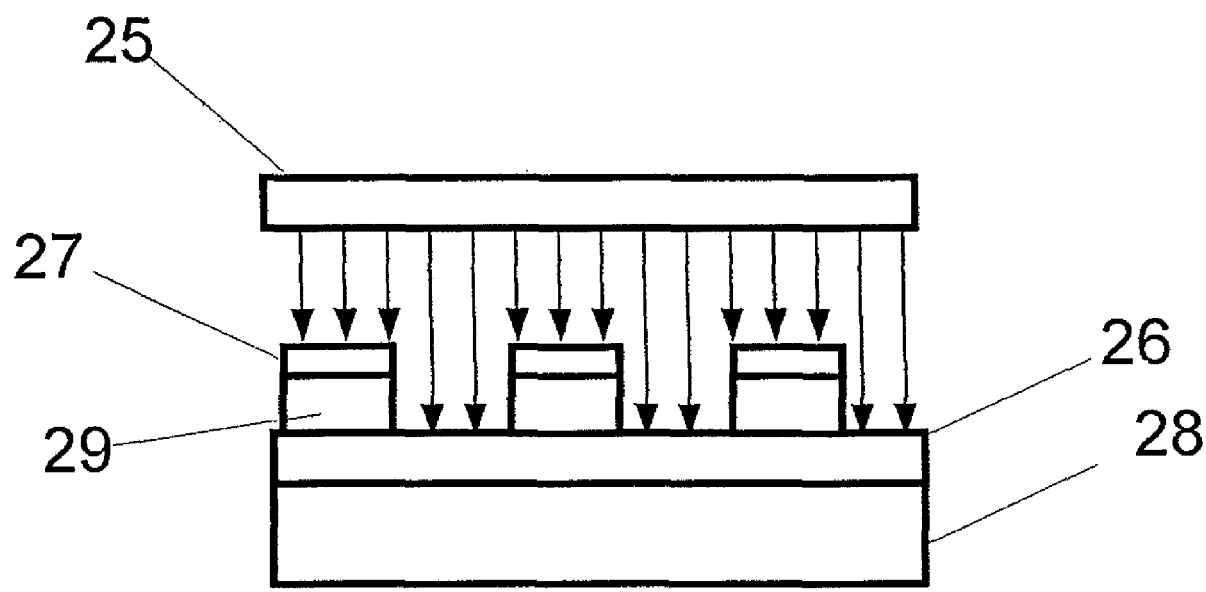
FIG. 4 is a simplified cross-sectional side view showing ultraviolet exposure of one set of sub-pixels to photoalign the LC cell.

Referring to FIG. 4, a UV light source 25 is used for the photoalignment. More particularly, to produce such different alignment directions on the photoalignment layer 26, a shadow mask 27 is used so that the reflective part and the transmittive part are exposed separately, as indicated in FIG. 4. A polarized ultraviolet light source 25 is used to illuminate the photoalignment layer 26 through the shadow mask 27. The photo exposure procedure can be either a single step process or a double step process consisting of an oblique angle of illumination. The shadow mask 27 is held closely to the substrate 28 so that parallax effect is minimized to provide good resolution.

The other alignment layer 29 is conventional polyimide. It is rubbed uniformly to provide a preferred direction for the LC molecules on the alignment layer 29. No patterning is needed for the reflective and transmittive sub-pixels. In combination with alignment layer 26, which has different alignment directions for the transmittive sub-pixel and the reflective sub-pixels, different twist angles are therefore produced for these two sub-pixels respectively. The reflective sub-pixel will have a twist angle of $\Phi_r$ and the transmittive sub-pixel will have a twist angle of $\Phi_t$.

Figure 5:
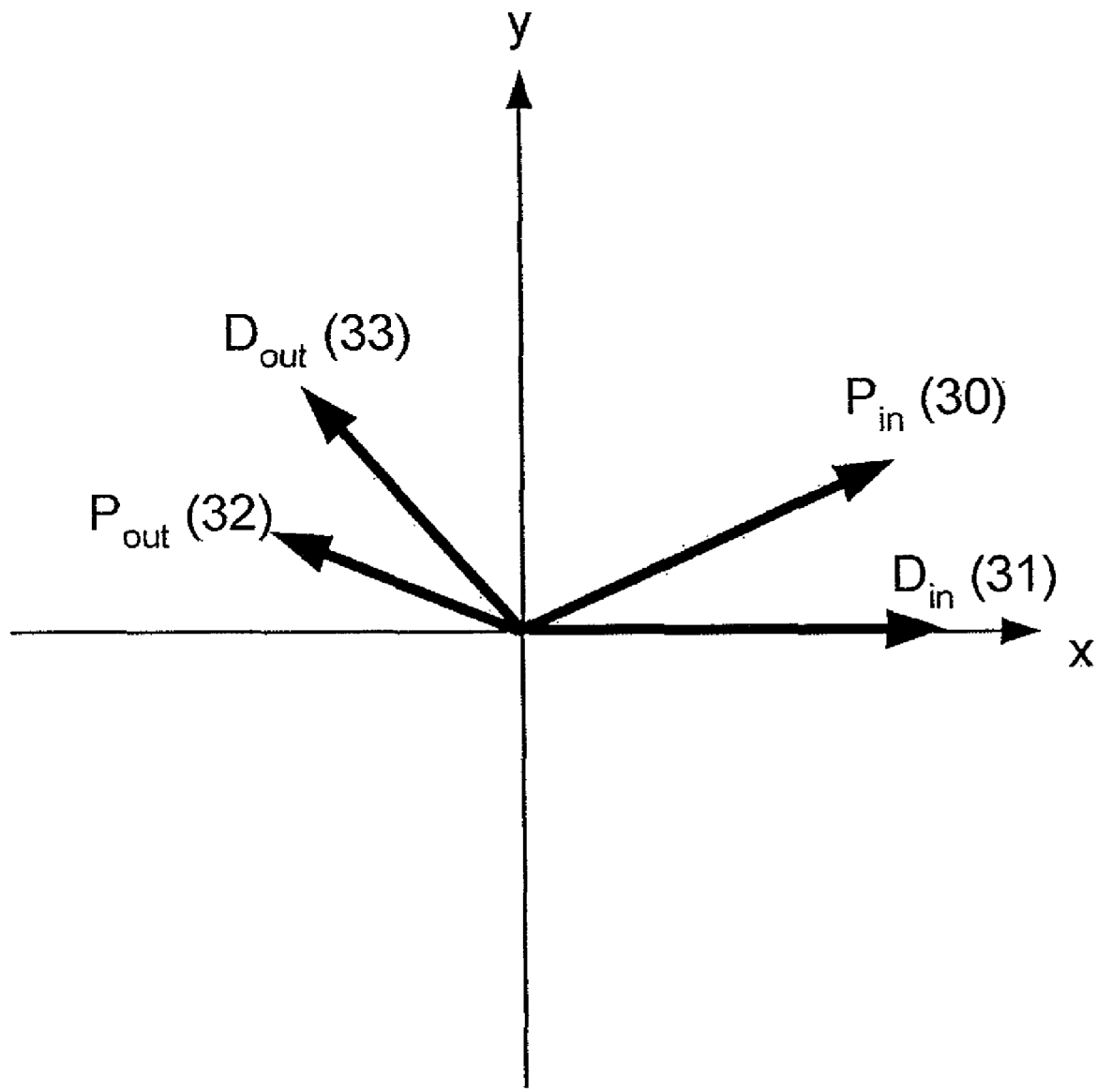
FIG. 5 is an angular plot showing the orientation of various angles of interest in an LCD.

FIG. 5 shows the various angles of a LCD that are important in determining its optical properties. The angles $D_{in}$ (31) and $D_{out}$ (33) are the input and output director angles of the LC cell. $P_{in}$ (30) and $P_{out}$ (31) are the orientations of the input (front) and output (rear) polarizers. The direction of $D_{in}$ is defined as the x-axis for convenience. The angle between the two directors will be the twist angle Φ. The angle of the input polarizer is referred to as α while the angle of the output polarizer is referred to as γ. The optical properties of the LCD can be determined by the 3 values of (α, Φ, dΔn). This is referred to as an LCD mode.

Figure 6:
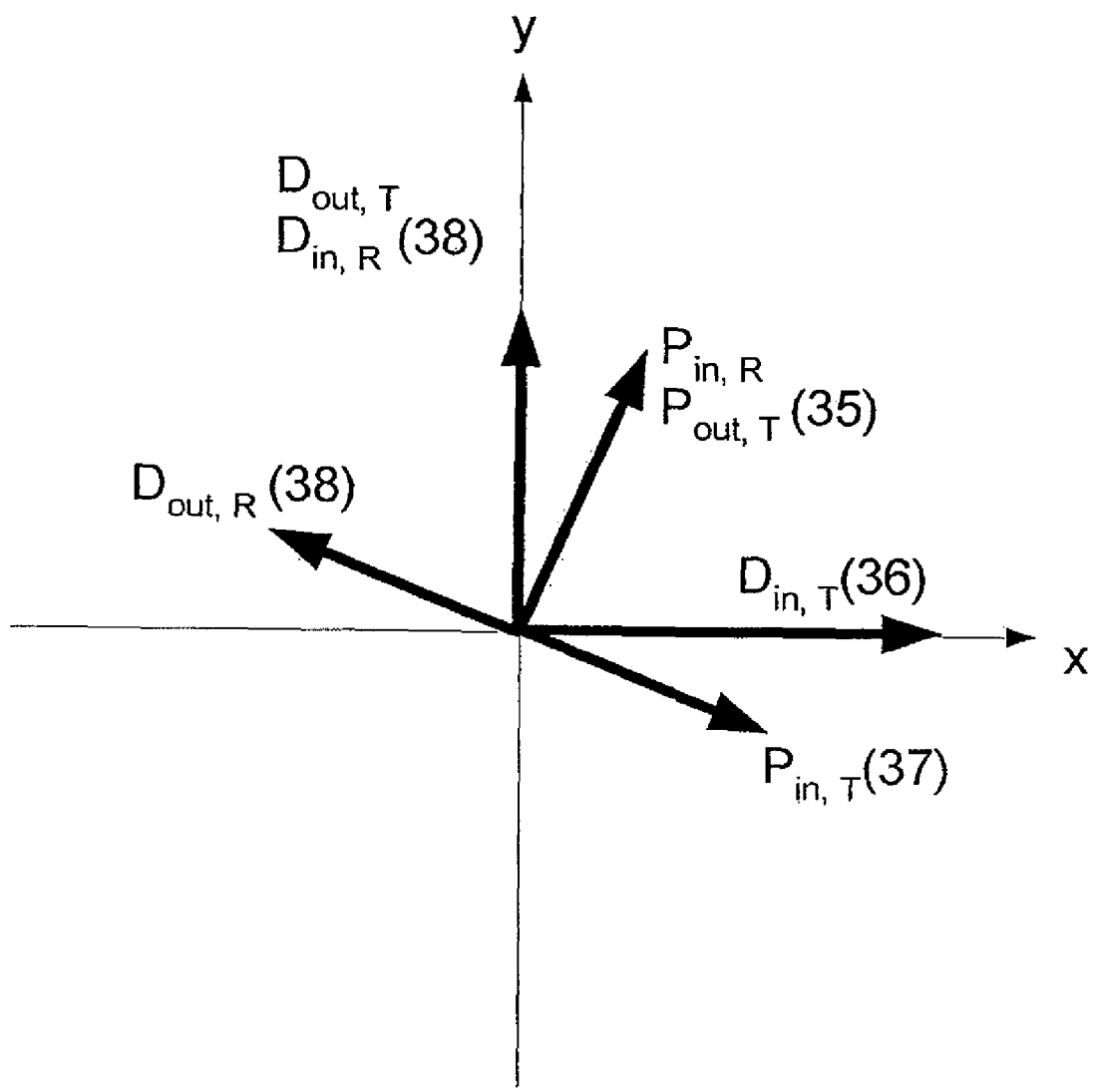
FIG. 6 is an angular plot showing the orientation of various angles of interest in a transflective LCD.

For the two-pixel transflective display, there are numerous vectors to consider. They are the $P_{in,T}$, $P_{out,T}$, $D_{in,T}$, $D_{out,T}$ vectors of the transmittive sub-pixel, and $P_{in,R}$, $D_{in,R}$, $D_{out,R}$ vectors of the reflective sub-pixel. (The reflective sub-pixel has only one polarizer.) It should be noted that in the present nomenclature, the input directions of the reflective and transmittive sub-pixels are opposite. Between the above vectors, the relation is that: (1) $D_{in,R}=D_{out,T}$; and (2) $P_{in,R}=P_{out,T}$. The first relation is necessary because the alignment layer is uniform and should produce the same alignment direction on alignment layer 20. The second relation is necessary because only one polarizer is used as the output polarizer for the transmittive sub-pixel and as the input polarizer of the reflective sub-pixel. Certainly the dΔn value of both the reflective LC mode and the transmittive LC mode are the same. Moreover, $D_{out,R}$ and $D_{in,T}$ are provided by the alignment layer 19. They can be at different directions by using the technique of photoalignment. The relationships between these directions are shown in FIG. 6.

In an embodiment of the invention, the combinations of the input polarizer angle, the twist angle of the transmittive sub-pixel and the d time Δn value are (0±10°, 90±10°, 0.56±0.1 µm). For the reflective sub-pixel it is (0±10°, 52±20°, 0.56±0.15 µm). The twist sense of the two sub-pixels can be independent of each other. So the signs of the twist angles can be changed without affecting the performance. The output polarizer angle is always at 90° to the input polarizer angle.

Figure 7A:
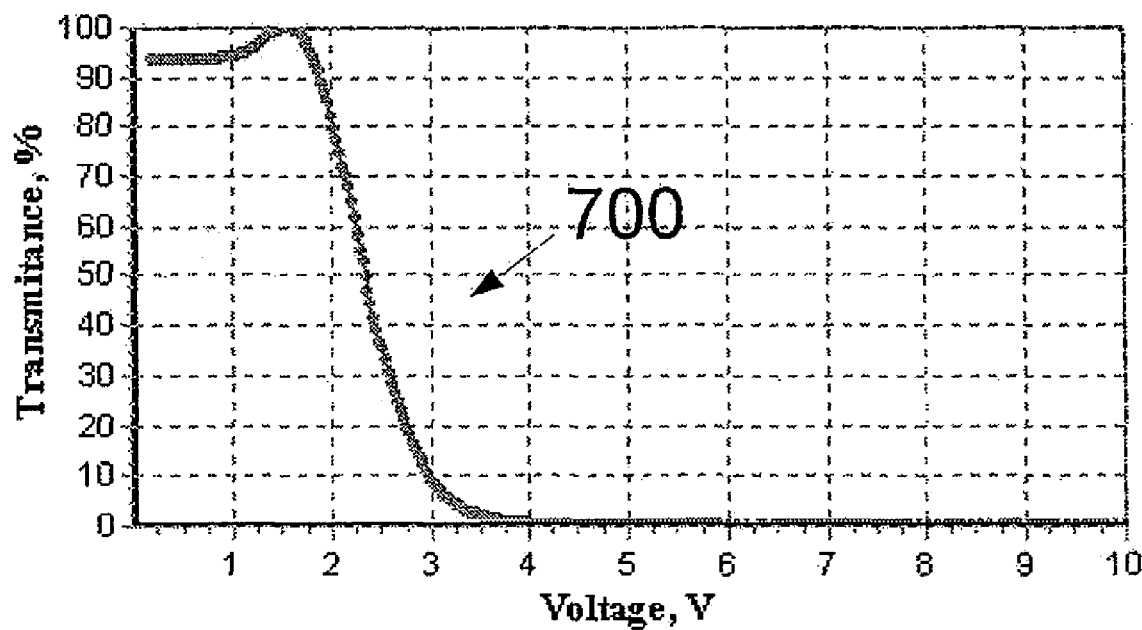
FIGS. 7a and 7b are voltage plots showing transmittance/voltage and reflectance/voltage curves of a transflective display.
Figure 7B:
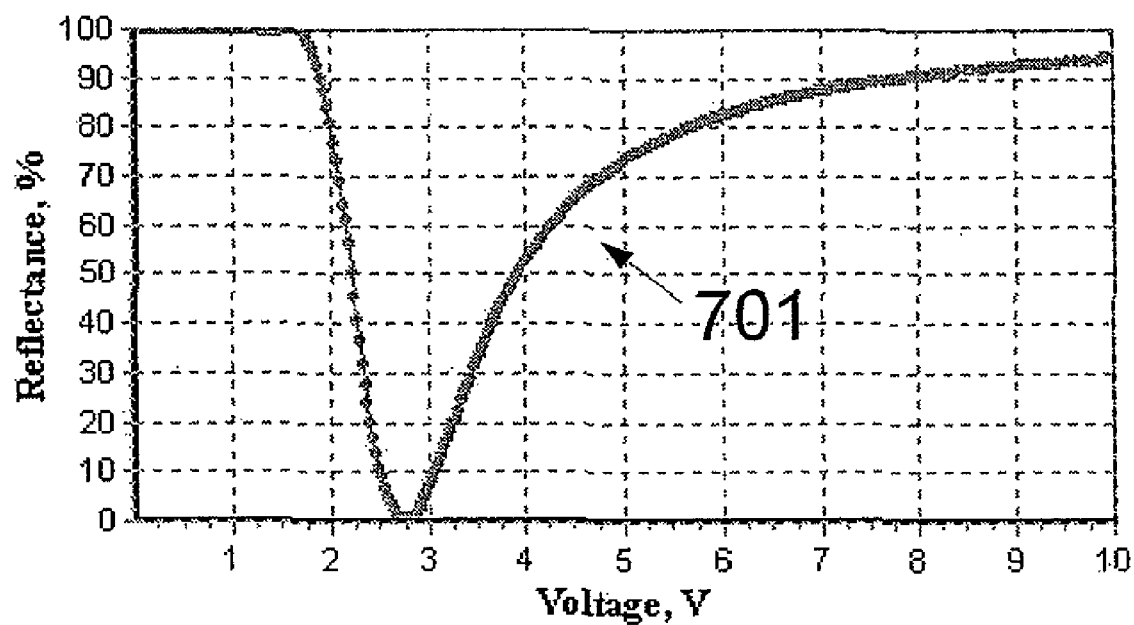

The plot 700 of FIG. 7a shows the transmittance of the transmittive sub-pixel as a function of applied voltage (TVC). The plot 701 of FIG. 7b shows the reflectance of the reflective sub-pixel as a function of applied voltage (RVC). These are simulated plots, and a typical LC material was used in this simulation. It can be seen that they follow the same trends.

As seen in FIGS. 7a and 7b, the gamma of the TVC and RVC are not exactly the same. If the voltage of the reflective sub-pixel is scaled to that of the transmittive sub-pixel, the TVC and RVC can be made to overlap substantially. This result demonstrates that the present invention is useful for transflective displays.

In another embodiment of the invention, the combinations of the input polarizer angle, the twist angle of the transmittive sub-pixel and the d time Δn value are (0±10°, 90±10°, 0.56±0.15 µm). For the reflective sub-pixel it is (−5+10°, 192±10°, 0.56±0.15 µm). The output polarizer angle is always at 90° to the input polarizer angle.

Figure 8:
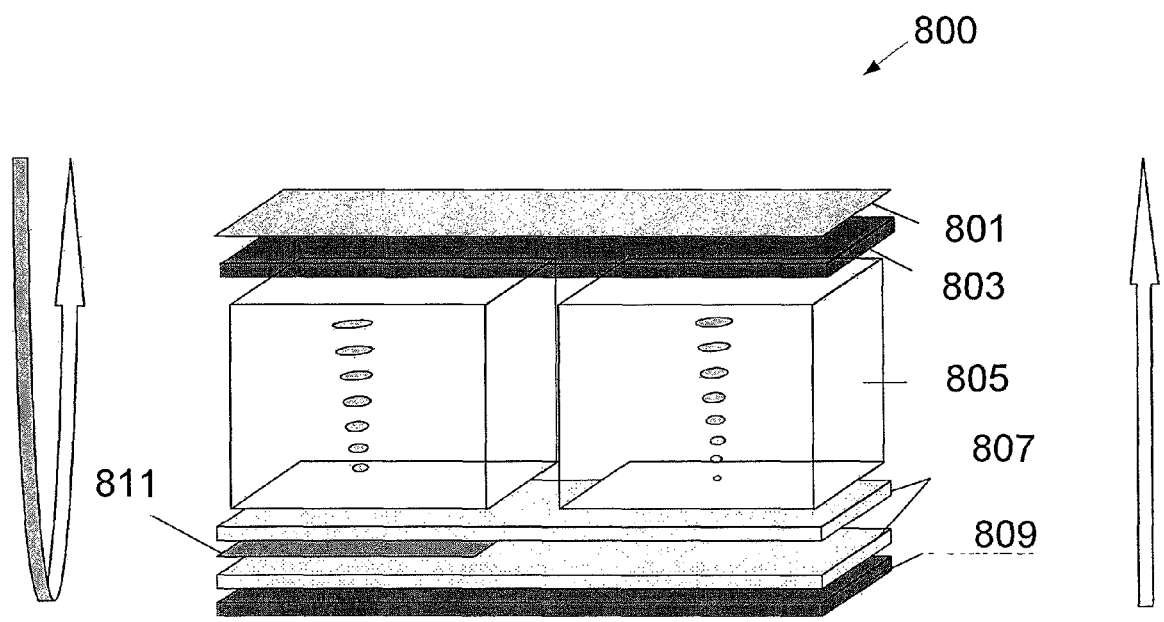
FIG. 8 is a perspective cross-sectional view showing the transflective LCD with two phase retardation plates according to an embodiment of the invention, wherein the phase retardation plates are quarter wavelengths (140 nm) plates with optimized location angles, and the twist angle in reflective region is 36 degrees, while in transmissive it is 90 degrees.

In yet another embodiment of the invention, retardation films can be provided to improve the contrast ratio and viewing angle of the display. The value and orientations of such retardation films can be optimized using standard LCD optimization procedures. In particular, the example of FIG. 8 shows the manner in which two quarter wave (140 nm) retardation plates can be used to improve the characteristics of the transflective LCD. The device 800 of FIG. 8 includes an anti-reflective layer 801, polarizer 803, LC layer 805, compensation layers 807, polarizer 809, and reflector 811.

Figure 9:
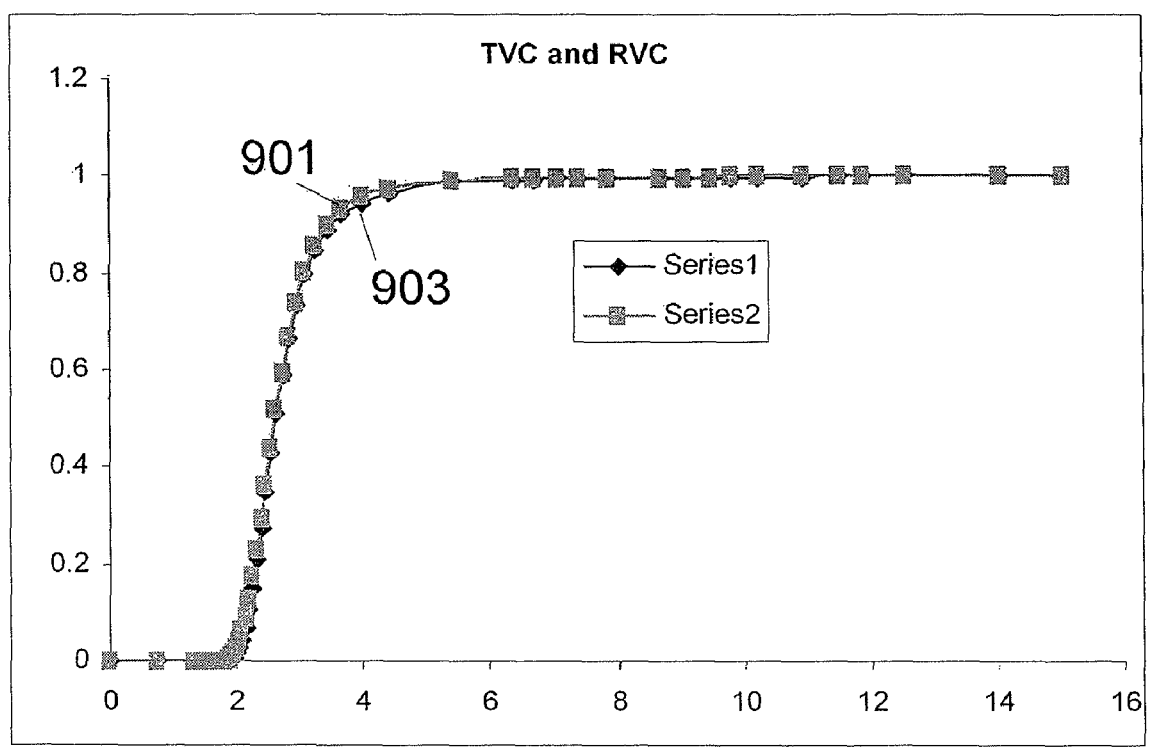
FIG. 9 is a plot of TVC and RVC for the device shown in FIG. 8, showing well-matched curves.

FIG. 9 illustrates a plot 900 of TVC and RVC for the device shown in FIG. 8, showing well-matched curves 901, 903. In fact, as can be seen, the TVC 901 and RVC 903 curves are entirely matched in this case. The twist angle in the reflective region is 36°, while the twist angle in the transmissive region is 90°.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A transflective liquid crystal display comprising two sub-pixels where one sub-pixel is for the reflective display and the other sub-pixel is for transmittive display, wherein the two sub-pixels have cell gaps that are substantially the same, and wherein the transflective liquid crystal display further comprises:
   a liquid crystal layer is provided for each sub-pixel;
   a plurality of alignment layers for both sub-pixels, with the alignment directions being different on one side of the liquid crystal layer and the same on the other side of the liquid crystal layer, wherein the different alignment directions on the one side of the liquid crystal layer are provided by a process of photoalignment.

2. A transflective liquid crystal display having two sub-pixels where one sub-pixel is for reflective display and one sub-pixel is for transmittive display, with the cell gaps being substantially the same for both sub-pixels, and having a liquid crystal layer in both sub-pixels, and wherein a twist angle of the liquid crystal layer in the reflective sub-pixel is in the range of 32 to 66 degrees, a polarizer angle of the reflective sub-pixel is in the range of −10 to 10 degrees, a twist angle of the liquid crystal layer in the transmittive sub-pixel being in the range of 80 to 100 degrees, the input polarizer of the transmittive sub-pixel being in the range of −10 to 10 degrees, the output polarizer angle of the transmittive sub-pixel being in the range of 80 to 100 degrees, and the retardation value of the liquid crystal layers being in the range of 0.41 to 0.71 microns.

3. A transflective liquid crystal display having two sub-pixels where one sub-pixel is for reflective display and one sub-pixel is for transmittive display, with the cell gaps being substantially the same for both sub-pixels, and having a liquid crystal layer in both sub-pixels, wherein a twist angle of the liquid crystal layer in the reflective sub-pixel is in the range of 182 to 202 degrees, a polarizer angle of the reflective sub-pixel is in the range of −15 to 5 degrees, a twist angle of the liquid crystal layer in the transmittive sub-pixel is in the range of 80 to 100 degrees, an input polarizer of the transmittive sub-pixel is in the range of −10 to 10 degrees, an output polarizer angle of the transmittive sub-pixel being in the range of 80 to 100 degrees, and a retardation value of the said liquid crystal layers being in the range of 0.46 to 0.66 microns.

4. The transflective liquid crystal display according to claim 1, wherein the alignment of the liquid crystal layers is a result of both photoalignment and mechanical rubbing of a polyimide thin film.

5. The transflective liquid crystal display according to claim 1, further comprising voltage application means, wherein voltages applied on the transmittive sub-pixel and on the reflective sub-pixel are related to each other by a constant ratio.

6. The transflective liquid crystal display according to claim 1, further comprising one or more retardation films.

7. The transflective liquid crystal display according to claim 6, wherein the one or more retardation films include one or more quarter wave retardation films.

8. The transflective liquid crystal display according to claim 1, further including means for providing selected voltages to the sub-pixels.

9. The transflective liquid crystal display according to claim 7, wherein a reflectance-voltage curve (RVC) and a transmittance-voltage curve (TVC) of the device are well-matched.

10. The transflective liquid crystal display according to claim 1, wherein the process of photoalignment producing different alignment directions on one side of the liquid crystal layer further comprises exposing a first predetermined subset of regions of a layer of photoalignment material coated on a first substrate of the transflective liquid crystal display with ultra violet light such that the first subset of regions are aligned in a first direction and exposing a second predetermined subset of regions of the photoalignment material on the first substrate of the transflective liquid crystal display with ultra violet light such that the second subset of regions are aligned in a second direction.

11. The transflective liquid crystal display according to claim 10, wherein the process of photoalignment further comprises using a shadow mask to expose the first subset of regions separately from the second subset of regions.

12. The transflective liquid crystal display according to claim 10, wherein the alignment direction on the other side of the liquid crystal layer is provided by mechanical rubbing of a polyimide thin film on a second substrate of the transflective liquid crystal display.

13. The transflective liquid crystal display according to claim 2, wherein the twist angles of the liquid crystal layer in the reflective sub-pixel and in the transmittive sub-pixel are determined by a photoalignment material coated on a first substrate of the transflective liquid crystal display, wherein a first predetermined subset of regions of the photoalignment material are exposed separately from a second predetermined subset of regions of the photoalignment material.

14. The transflective liquid crystal display according to claims 3, wherein the twist angles of the liquid crystal layer in the reflective sub-pixel and in the transmittive sub-pixel are determined by a photoalignment material coated on a first substrate of the transflective liquid crystal display, wherein a first predetermined subset of regions of the photoalignment material are exposed separately from a second predetermined subset of regions of the photoalignment material.

* * * * *